3,077,472
3-[4-(AMINOALKOXY)-PHENYL]-4-(4-OXY-
PHENYL)-ALKANES AND ALKENES
Joseph H. Burckhalter, Ann Arbor, Mich., assignor to
University of Kansas Research Foundation, Lawrence,
Kans.
No Drawing. Filed Mar. 21, 1961, Ser. No. 97,126
7 Claims. (Cl. 260—247.7)

This invention relates to novel aryl ether compounds and means of obtaining the same. More particularly, the invention relates to aryl ether compounds having in free base form the general formula,

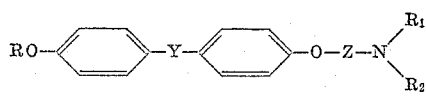

acid salts thereof and the corresponding quaternary lower alkyl ammonium salts having the general formula,

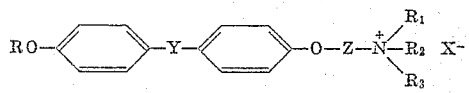

where R represents hydrogen or a lower alkyl group (i.e., an alkyl group containing 1 to 4 carbon atoms, preferably methyl or ethyl), $R_1$ and $R_2$ independently represent lower alkyl groups (i.e., alkyl groups having from 1 to 4 carbon atoms) or when taken together with —N< represent a saturated heterocyclic radical such as pyrrolidino, piperidino, piperazino, morpholino, hexamethyleneimino and lower alkyl (i.e., 1 to 4 carbon alkyl) substituted derivatives thereof, the alkyl group being substituted at the secondary nitrogen atom where present or at one or more of the heterocyclic carbon atoms, $R_3$ is a lower alkyl group, i.e., an alkyl group having from 1 to 4 carbon atoms, X is an anion such as a chloride, bromide, iodide, sulfate or paratoluene sulfonate anion, Y represents a divalent hydrocarbon bridge containing not more than 3 carbon atoms optionally being substituted with one or more lower aliphatic groups, such as

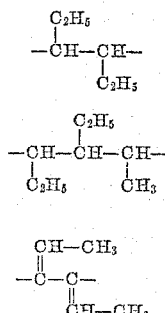

and

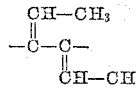

and Z is a divalent alkylene group containing 2 to 4 carbon atoms.

As indicated, the invention contemplates products in the free base form having the first formula mentioned above, or in salt form with an inorganic or organic acid. As examples of the many acid salts contemplated by the invention there may be mentioned the mineral acid salts such as the hydrochloride, hydrobromide, hydroiodide, sulfate, phosphate and the like, and organic acid salts such as the citrate, tartrate, acetate, benzoate, phenylsulfonate, p-toluene sulfonate, sulfamate and like salts.

In accordance with the invention, the new aryl ether compounds are prepared by the reaction of an alkali metal salt compound having the formula,

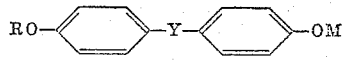

with a haloalkylamine Hal-Z-NR$_1$R$_2$ in the presence of an inert organic solvent; where M represents an alkali metal atom such as sodium or potassium, Hal is a halogen atom, and R, $R_1$, $R_2$, Y and Z have the foregoing significance. The reaction temperature is not critical. Although the reaction can be carried out at room temperature, it is preferable to operate at elevated temperature, preferably from 70–110° C. and for best results at the reflux temperature of the reaction mixture, in order to minimize the reaction time. As examples of some of the various suitable solvents there may be mentioned benzene, toluene, xylene, dioxane, petroleum ether, dimethyl formamide and the like.

The quaternary ammonium salts having the general formula indicated above are prepared in accordance with the invention by reacting the mentioned aryl ether having the general formula,

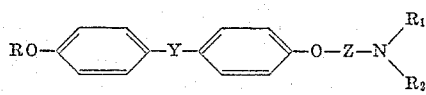

with an equivalent amount of an alkyl ester such as an alkyl halide, sulfate or sulfonate having the formula, $R_3X$; where $R_1$, $R_2$, $R_3$, X, Y and Z have the above mentioned significance. The reaction may be carried out over a wide range of temperature as desired, e.g., at room temperature or higher temperature. The reaction with alkyl bromides or iodides proceeds quite readily in short periods of time, whereas the reaction wtih alkyl chlorides may require longer periods unless one employs an elevated temperature. Conveniently, the reaction may be carried out by dissolving the aryl ether starting material in an inert organic solvent such as ether, benzene, and the like, and by treating the resulting solution with the alkyl ester. The resulting quaternary ammonium compound obtained in the reaction can be readily isolated by precipitation from solution brought about by the addition of an organic solvent in which the product is insoluble such as petroleum ether and the like. The product which precipitates is then conveniently recovered as by filtration, decantation, etc.

The products of the invention possess significant antibacterial properties and hence are useful as germicidal ingredients of soaps, detergents and the like. They are particularly useful when administered orally, as agents for the lowering of the cholesterol level of the blood. The compounds of the instant invention possess little or no immediate estrogenic activity, thus making the compounds particularly adaptable for administration in those conditions where it is desired to lower the cholesterol blood level without causing the undesirable estrogenic side effects normally associated with the use of certain anti-hypercholesterolemic substances. The indicated oral dosage is in general about 1–10 mg./kg. daily. The compounds are preferably administered in acid salt form which can be obtained from the corresponding free base by dissolving the latter in a suitable solvent such as ether, treating the solution with at least one equivalent of the desired acid and recovering the solid product which separates from solution. The invention contemplates the mentioned acid addition salts and quaternary ammonium salts broadly and includes such salts whether non-toxic or toxic since any salts of the invention which are considered toxic are nevertheless useful as intermediates for the production of non-toxic salts or the corresponding free base, being readily convertible thereto by means which per se are known to those skilled in the art.

The invention is illustrated by the following examples:

*Example 1*

(a) An aqueous solution containing 2.8 g. of 2-chloro-N,N-dimethylethylamine hydrochloride is neutralized with a slight excess of aqueous 20% sodium hydroxide solution. The mixture is extracted with benzene and the extracts dried over anhydrous potassium carbonate. The resulting benzene solution, after filtration, is slowly added with stirring to a mixture of 4.7 g. of hexestrol monomethyl ether, 0.8 g. of sodamide and 100 ml. of dry benzene which mixture has been preliminarily stirred and refluxed for two hours. The resulting reaction mixture is subjected to continued reflux for 11 hours, cooled and filtered. The filtrate is saturated with dry hydrogen chloride gas and the product which separates on standing is isolated by filtration. This product, 3-[4-(2-dimethylamino-ethoxy)-phenyl]-4-(4-methoxyphenyl)-hexene hydrochloride, can be purified by recrystallization from ethanol-ether mixture; M.P. 162–163° C.

(b) A solution of 3-[4-(2-dimethylaminoethoxy)-phenyl]-4-(4-methoxyphenyl)-hexane hydrochloride (1.5 g.) in 175 ml. of hot water is neutralized with dilute aqueous potassium carbonate solution, the neutral solution is cooled, extracted successively with three 50-ml. portions of benzene and the extracts dried over anhydrous sodium sulfate. The drying agent is removed by filtration and 2 ml. of methyl iodide is added to the filtrate with stirring. The resulting product, 3-[4-(2-dimethylaminoethoxy)phenyl]-4-(4-methoxyphenyl)-hexane methoiodide hemihydrate, which forms as a cloudy precipitate within ten minutes is removed by filtration and purified by recrystallization from isopropanol; M.P. 197–198° C.

*Example 2*

A solution of 3-[4-(2-dimethylaminoethoxy)phenyl]-4-(4-methoxyphenyl)-hexane hydrochloride (7½ g.) in 30 ml. of hot water is neutralized with dilute aqueous potassium carbonate solution; the neutral solution is cooled, extracted successively with three 30-ml. portions of benzene and the extracts dried over anhydrous sodium sulfate. The drying agent is removed by filtration, and an excess of methyl chloride gas is slowly bubbled into the filtrate for three hours. The reaction mixture is allowed to stand for 16 hours and is then filtered and the filter cake washed with ether. The product, 3-[4-(2-dimethylaminoethoxy)-phenyl] - 4 - (4 - methoxyphenyl)-hexane methochloride hydrate, is dried in air and purified by recrystallization from isobutyl alcohol-ether mixture; M.P. 231–232° C.

*Example 3*

To a 500-ml. flask equipped with a stirrer, dropping funnel and a condenser fitted with a drying tube is added 100 ml. of dimethylformamide and 1.7 g. of a 50% dispersion of sodium hydride in mineral oil. To this suspension is added portion-wise 8.5 g. of monoethyl ether of hexestrol. The mixture is stirred for one hour at 90° C. and then cooled at room temperature. To the reaction mixture is added an ethereal solution of β-chloro-N-ethylpiperidine prepared as follows: 7.5 g. of N-(β-chloroethyl)-piperidine hydrochloride is treated with ether and excess ice-cold 5% aqueous sodium hydroxide and the layers are separated and the aqueous layer extracted twice with ether. The combined ether extracts are dried over magnesium sulfate and phosphorous pentoxide, and the dry mixture is filtered.

The reaction mixture to which the N-(β-chloroethyl)-piperidine solution is added is heated at 90° C. for 20 hours and a small amount of water is added cautiously to destroy any excess sodium hydride. The solvents are evaporated in vacuo and the residue is taken up in water and ether mixture. The layers are separated and the aqueous layer washed twice with ether. The combined ether extracts are dried over magnesium sulfate, treated with decolorizing charcoal and filtered. Excess dry hydrogen chloride is added to the filtrate and the solid product which separates, 3-[4-(1-piperidylethoxy)-phenyl]-4-(4-methoxyphenyl)-hexane hydrochloride, is collected and crystallized from hot absolute ethanol to which dry ether is added to the point of incipient precipitation and the mixture is cooled, washed with dry ether and dried in a vacuum oven at room temperature; M.P. 160–161.5° C. after recrystallization from absolute ethanol and dry ether.

The same procedure can be used for the preparation of 3-[4-(1-pyrrolidinylethoxy)-phenyl] - 4 - (4-methoxyphenyl)-hexane hydrochloride and 3-[4-(N-2,2-dimethylpyrrolidinylethoxy) - phenyl]-4-(4 - methoxyphenyl)-hexane hydrochloride starting with 42.6 g. of hexestrol monomethyl ether, 8.4 g. of sodium hydride (50% dispersion in mineral oil) in 500 ml. of dimethylformamide and the amine obtained by the neutralization of N-(β-chloroethyl)-pyrrolidine hydrochloride (34.0 g.) and N-(β-chloroethyl)-2,2-dimethylpyrrolidine hydrochloride (39.8 g.), respectively.

*Example 4*

(a) A mixture of 5.7 g. of hexestrol monobenzyl ether, 0.8 g. of sodamide and 100 ml. of dry benzene is stirred and heated at reflux temperature for two hours for the formation of the sodium salt. A benzene solution of N-2-chloroethylpiperidine is slowly added; stirring and refluxing are continued for 11 hours. The mixture is cooled and the solid sodium chloride is removed by filtration. The benzene solution is saturated with hydrogen chloride, cooled and filtered. The product is 3-[4-(N-piperidylethoxy) - phenyl] - 4 - (4 - benzoxyphenyl)hexane hydrochloride.

(b) Two g. of the hydrochloride prepared above is dissolved in 25 ml. of glacial acetic acid and treated with 1 g. of 2% palladium on charcoal catalyst. The mixture is hydrogenated with hydrogen at two atmospheres of pressure until a theoretical amount of hydrogen is absorbed. The glacial acetic acid is removed by distillation in vacuo and the residue is dissolved in 150 ml. of hot water and neutralized with aqueous sodium bicarbonate solution. The mixture is cooled and extracted three times with benzene and the benzene solutions dried over anhydrous sodium sulfate. The product, 3-[4-piperidylethoxy)-phenyl]-4-(4-hydroxyphenyl)-hexane, can be recovered as a residue after removal of the benzene in vacuo, or, after introduction of an equivalent of phosphoric acid, can be recovered as the insoluble phosphate salt by filtration.

(c) Two ml. of methyl iodide is added to the benzene solution of 3-[4-(N-piperidylethoxy)-phenyl]-4-(4-hydroxyphenyl)-hexane (Example 4b) and the mixture allowed to stand for 16 hours at room temperature. The product which separates, 3-[4-(N-piperidylethoxy)-phenyl]-4-(4-hydroxyphenyl)-hexane methoiodide, is removed from the reaction mixture by filtration.

*Example 5*

(a) A solution of 5.6 g. of 3-chloro-N,N-diethylpropylamine hydrochloride in a minimum volume of water is neutralized with 30% sodium hydroxide solution and the mixture extracted with benzene. The combined extracts are dried over anhydrous potassium carbonate and filtered.

(b) A mixture of 5.6 g. of dienestrol monomethyl ether, 0.8 g. of sodamide and 100 ml. of dry benzene is stirred and heated at reflux temperature for two hours following which the solution prepared in accordance with (a) above is slowly added with stirring and heating at reflux temperature. Stirring and heating are continued for ten hours after the addition and the mixture is cooled and filtered. The filtrate is saturated with hydrogen chloride and the product separating as a white solid, 3-(4-methoxyphenyl)-4-[4-(3-diethylaminopropoxyphenyl)]-2,4-hexadiene hydrochloride, is collected on a filter and then purified by recrystallization from alcohol and ether.

(c) A solution of 3-(4-methoxyphenyl)-4-[4-(3-diethylaminopropoxyphenyl)]-2,4-hexadiene hydrochloride (2 g.) in 200 ml. of water is neutralized with dilute aqueous potassium carbonate solution and the resulting mixture is extracted with three 50-ml. portions of benzene and the extracts dried over anhydrous sodium sulfate.

The extracts are filtered and an excess of methyl chloride gas is bubbled through the filtrate for two hours. The reaction mixture is allowed to stand for about 16 hours and the resulting solid product is collected by filtration and washed with ether. The product, 3-(4-methoxyphenyl) - 4 - [4 - (3 - diethylaminopropoxyphenyl)] - 2,3-hexadiene methochloride, can be purified by recrystallization from acetonitrile.

*Example 6*

(a) A mixture of 6.5 g. of 3-ethyl-2-(4-ethoxyphenyl)-4-(4-hydroxyphenyl)-hexane [prepared according to the method of Wilds et al., J.A.C.S., 70, 4128 (1948), starting from diethyl sulfate and benzestrol], 0.8 g. of sodamide and 100 ml. of dry benzene is heated at reflux temperature for three hours. A solution of 4.3 g. of 3-chloro-N,N-dimethylpropylamine in 100 ml. of benzene is slowly added during reflux and the mixture is further refluxed for ten hours. The reaction mixture is thereupon cooled, filtered and the filtrate saturated with dry hydrogen chloride gas. The product, 3-ethyl-2-(4-ethoxyphenyl) - 4 - [4 - (3 - dimethylaminopropoxyphenyl)]-hexane hydrochloride, separates and is collected by filtration and recrystallized from alcohol-ether mixture.

(b) A solution of 2 g. of the hydrochloride product of (a) in 150 ml. of water is neutralized with dilute aqueous potassium carbonate solution. The resulting mixture is extracted with three 30-ml. portions of benzene and the extracts dried over anhydrous sodium sulfate. The extracts are filtered and an excess of ethyl iodide is added to the filtrate with stirring. After standing for two hours, the mixture is taken to dryness in vacuo and the residual product recrystallized from acetonitrile-ethanol. The product is 3-ethyl-2-(4-ethoxyphenyl)-4-[4-(3-dimethylaminopropoxyphenyl)]-hexane ethoiodide.

*Example 7*

(a) A mixture of 4 g. of 85% potassium hydroxide in 200 ml. of water and 8.1 g. of hexestrol is stirred and heated while 4.3 g. of 2-chloro-N,N-dimethylethylamine hydrochloride in 25 ml. of water is added dropwise over a period of one hour. Stirring and heating are continued for an hour after which the mixture is extracted with 50 ml. of benzene. The benzene layer is separated and extracted with 20 ml. of 10% potassium hydroxide solution. The water layers are combined and then treated with glacial acetic acid until slightly acidic. The mixture is extracted successively with several portions of ether and the extracts combined, dried over anhydrous sodium sulfate and filtered. The filtrate is concentrated to dryness in vacuo and the residual product, 3-[4-(2-dimethylaminoethoxy)phenyl]-4-(4-hydroxyphenyl)-hexane, is purified by recrystallization from acetonitrile.

(b) The product of (a) is dissolved in ether and the ethereal solution treated with an excess of dry gaseous hydrogen bromide. The hydrobromide salt which separates from the solution is collected and purified by recrystallation from isopropanol. Likewise, the tartrate salt can be prepared by adding such an ether solution to an isopropanol solution containing an equivalent amount of tartaric acid and recovering the solid tartrate salt which separates on standing.

(c) The product of (a) is dissolved in benzene and an excess of methyl chloride gas is passed through the solution for two hours. After standing for two hours, the mixture is filtered and the product recovered as the filter cake. The product is 3-[4-(2-dimethylaminoethoxy)phenyl]-4-(4-hydroxyphenyl)-hexane methochloride.

*Example 8*

(a) An aqueous solution of 3-dimethylaminopropyl chloride hydrochloride is neutralized and extracted by the same procedure set forth in Example 1 except that ether is used in place of benzene and the solution is dried over magnesium sulfate. The resulting ether solution after filtration is added to a suspension of 28.4 g. of hexestrol monomethyl ether, 2.6 g. of sodium hydride and 200 ml. of benzene, which suspension has been preliminarily stirred and refluxed for one hour. The mixture is refluxed for four hours and then added to 10% aqueous sodium hydroxide solution. The mixture is extracted successively with ether. The ether extracts are combined, dried, evaporated in vacuo and the residual product, 3 - [4 - (3 - dimethylaminopropoxy) - phenyl] - 4 - (4 - methoxyphenyl)-hexane, is purified by crystallization from ethanol-water; M.P. 68–71° C.

(b) The product of (a) is dissolved in acetonitrile and dry methyl chloride gas in excess is bubbled through the solution for two hours. The solvent is removed by distillation and the residue thoroughly triturated with ether. The residual product after removal of solvent, 3-[4-(3-dimethylaminopropoxy) - phenyl] - 4 - (4 - methoxyphenyl)-hexane methochloride trihydrate, is obtained in crystalline form after exposure to the atmosphere for 24 hours; M.P. 203–205° C.

*Example 9*

An aqueous solution containing 9 g. of N-(2-chloroethyl)-hexamethyleneimine hydrochloride is neutralized with a slight excess of aqueous 10% sodium hydroxide solution. The mixture is extracted with benzene and the extract dried over anhydrous magnesium sulfate. The mixture is filtered and the filtrate is slowly added with stirring to a mixture of 8.5 g. of hexestrol monomethyl ether, 1.8 g. of sodamide and 200 ml. of dry benzene, which mixture has been preliminarily stirred and refluxed for two hours. The resulting reaction mixture is subjected to continued refluxing for 11 hours, cooled and filtered. The filtrate is saturated with dry hydrogen chloride gas and the product which separates, 3-[4-(N-hexamethyleneiminoethoxy) - phenyl] - 4 - (4 - methoxyphenyl)-hexane hydrochloride, is collected by filtration.

*Example 10*

A warm anhydrous benzene solution of 50 g. of hexestrol monomethyl ether is added portion-wise to a well-stirred mixture of 8.88 g. of 50% oil dispersion of sodium hydride in 350 ml. of anhydrous dimethylformamide. The mixture is stirred at room temperature until the evolution of hydrogen ceases. The resulting mixture is then refluxed and stirred while an anhydrous benzene solution of 27.6 g. of N-(β-chloroethyl)-morpholine is added dropwise in the course of approximately one hour. After 24 hours of continued refluxing, the solution is extracted several times with cold water. The organic layer is dried by azeotropic distillation, filtered and saturated with gaseous hydrogen chloride. The product which separates, 3-[4-(4-morpholinylethoxy)-phenyl]-4-(4-methoxyphenyl)-hexane hydrochloride, is collected and recrystallized twice from acetone; M.P. 155–156.5° C.

*Example 11*

(a) Following the procedure of Example 3, 0.15 mol. of hexestrol monomethyl ether, 0.17 mol. of sodium hydride (50% dispersion in mineral oil) in 500 ml. of dimethylformamide, and the amine obtained from neutralization of 56 g. of β-chloro-2-(N-methyl-N-butylamino)-ethane hydrochloride are reacted. After the heating period, the reaction mixture is cooled, a small amount of water is added to destroy excess sodium hydride, and the solvents are evaporated in vacuo. The residue is taken up in hot 95% ethanol, treated with decolorizing charcoal, filtered, crystallized by addition of water to the point of incipient precipitation, and the mixture is cooled. The product is dissolved in ether, the ether solution washed with dilute hydrochloric acid, dried, and the ether is then removed by evaporation. The crystalline residue obtained is dissolved in ether and ethyl acetate, washed with dilute aqueous sodium hydroxide solution, dried, and the organic solvent is removed by evaporation. To the residual free base product, 3-[4-(2-N-butyl-N-methylamino-ethoxy)-phenyl]-4-(4-methoxyphenyl)-hexane, is added a slight excess of a saturated solution of hydrogen chloride in isopropanol and the monohydrochloride salt of the free base, which separates, is collected; M.P. 163–165° C. after recrystallization first from isopropanolether mixture and then from ethyl acetate.

(b) Following the procedure of (a) above, 28.4 g. of hexestrol monomethyl ether, 5.3 g. of sodium hydride (50% dispersion in mineral oil) in 200 ml. of dimethylformamide and the amine obtained from the neutralization of 24.1 g. of 3-dimethylamino-2-methyl-1-chloropropane hydrochloride are reacted, the amine being added as a solution in approximately 19 ml. of benzene. After the heating period, the reaction mixture is cooled and then added to 500 ml. of water. A few drops of concentrated aqueous sodium hydroxide solution are added to pH 9.5. The aqueous solution is extracted successively with ether, the combined ether extracts washed with water, dried over anhydrous magnesium sulfate and filtered. On evaporation of the ether the residual product, 3-[4-(3 - dimethylamino - 2-methylpropoxy) - phenyl] - 5-(4-methoxyphenyl)-hexane, is obtained and is purified by recrystallization twice from absolute ethanol; M.P. 66–67° C.

*Example 12*

A solution of 50 g. of hexestrol monomethyl ether in benzene is slowly added to a stirred mixture of 8.88 g. of sodium hydride (50% oil dispersion) in 350 ml. of anhydrous dimethylformamide. The mixture is stirred until hydrogen evolution ceases and is then heated to reflux and stirred while a benzene solution of 32.5 g. of N-(β-chloroethyl)-N'-ethylpiperazine is added dropwise. The resulting mixture is heated at reflux for 20–24 hours, cooled, extracted with water, and the organic layer dried by azeotropic distillation, filtered and the filtrate saturated with gaseous hydrogen chloride. The resulting solid product, 3-[4 - (N'-ethyl - N-piperazinylethoxy)-phenyl]-4 - (4-methoxyphenyl) - hexane hydrochloride, is collected by filtration and purified by recrystallization from acetone.

This application is a continuation-in-part of my copending application Serial No. 746,669, filed July 7, 1958, now abandoned.

I claim:

1. A member of the group consisting of a free base, acid addition salts thereof and the corresponding quaternary lower alkylammonium salts wherein the anion is a member selected from the group consisting of chloride, bromide, iodide, sulfate and para-toluene sulfonate, said free base having the formula,

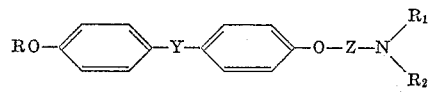

where R is a member of the group consisting of hydrogen and lower alkyl, $R_1$ and $R_2$ independently represent a number selected from the group consisting of lower alkyl and further members wherein $R_1$ and $R_2$ taken together with $-N<$ represent a heterocyclic radical of the group consisting of pyrrolidino, piperidino, piperazino, morpholino, hexamethyleneimino and lower alkyl substituted derivatives thereof, Y is a member of the group consisting of

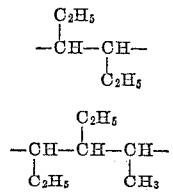

and and Z is a divalent alkylene group containing 2 to 4 carbon atoms.

2. 3-[4-(1-piperidylethoxy) - phenyl] - 4-(4-methoxyphenyl)-hexane hydrochloride.

3. 3-[4-(2 - dimethylaminoethoxy) - phenyl]-4-(4-methoxyphenyl)-hexane hydrochloride.

4. 3-[4-(2 - dimethylaminoethoxy) - phenyl]-4-(4-methoxyphenyl)-hexane methohalide.

5. 3-[4-(1-pyrrolidinylethoxy) - phenyl]-4-(4-methoxyphenyl)-hexane hydrochloride.

6. 3-[4-dimethylaminopropoxy) - phenyl] - 4-(4-methoxyphenyl)-hexane.

7. 3-[4-(4-morpholinylethoxy) - phenyl]-4-(4-methoxyphenyl)-hexane hydrochloride.

References Cited in the file of this patent

UNITED STATES PATENTS

| | | |
|---|---|---|
| 2,668,813 | Goldberg | Feb. 9, 1954 |
| 2,796,435 | Goldberg | June 18, 1957 |